Feb. 6, 1951

H. W. KRANZ 2,540,585

FORK ASSEMBLAGE FOR BICYCLES

Filed Jan. 17, 1948

INVENTOR.
HARRY W. KRANZ
BY
Oberlin & Limbach
ATTORNEYS.

Feb. 6, 1951 H. W. KRANZ 2,540,585
FORK ASSEMBLAGE FOR BICYCLES
Filed Jan. 17, 1948 2 Sheets-Sheet 2

INVENTOR.
HARRY W. KRANZ
BY
Oberlin & Limbach
ATTORNEYS.

Patented Feb. 6, 1951

2,540,585

UNITED STATES PATENT OFFICE 2,540,585

FORK ASSEMBLAGE FOR BICYCLES

Harry W. Kranz, Cleveland, Ohio, assignor to The Cleveland Welding Company, Cleveland, Ohio, a corporation of Ohio Application January 17, 1948, Serial No. 2,889

7 Claims. (Cl. 280—276)

The present invention relates generally, as indicated, to a fork assemblage for bicycles and the like, and more especially to a front wheel spring fork assemblage which is operative to cushion shock and impact loads which would otherwise be transmitted directly from the wheel supported in one end of said assemblage to the handlebars connected to the other end of said assemblage.

In known assemblages of the character indicated, spring means are usually interposed between telescoped upper and lower elements of the fork assemblage whereby shocks are absorbed by upward movement of the front wheel carrying lower element relative to the bicycle frame and to the handlebars connected to the upper of such elements. Thus, in such assemblages, the position of the frame with a driver seated thereon is largely dependent upon the weight of the driver because his weight is supported between relatively vertical movable elements. Furthermore, inasmuch as the front wheel axle is usually disposed forwardly of the generally vertically disposed fork bearing in the frame which rotatably supports the stem portion of the fork any stresses on said assemblage will impose a cocking action on the telescoped elements whereby to materially reduce the effectiveness of the shock absorbing springs compressed therebetween.

Accordingly, it is one primary object of the present invention to provide a fork assemblage wherein the shock absorbing movements are along an arcuate path so disposed relative to the bicycle frame that the position of the frame is not appreciably changed when persons of different weights drive the same and when varying shock loads are imposed thereon.

Another object of this invention is to provide a fork assemblage which avoids the aforesaid cocking action to thus render the spring means fully effective to cushion shocks.

Another object of this invention is to provide a fork assemblage which is of sturdy and simple construction, which is ideally suited for its intended purposes and which may be economically manufactured.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figures 1, 2:
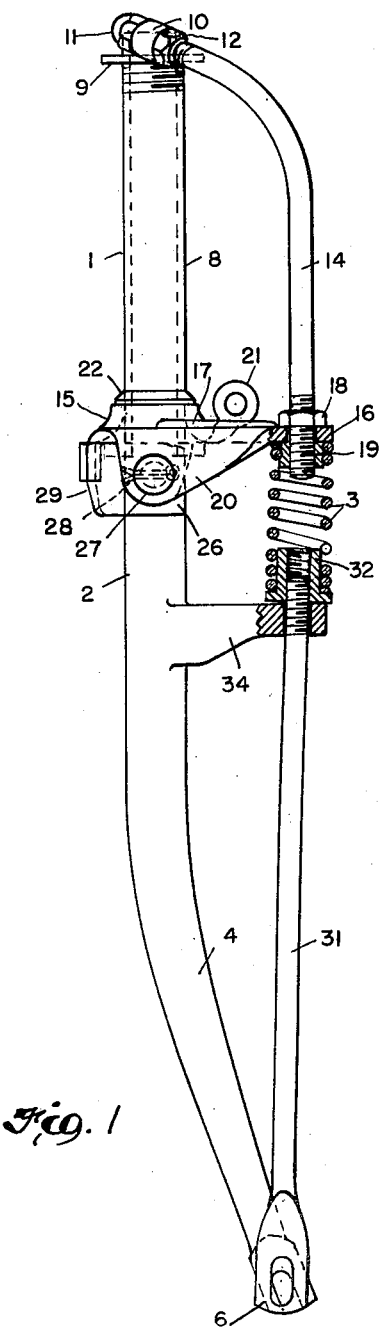
Fig. 1 is a side elevation view partly in section of a preferred embodiment of this invention.
Fig. 2 is a front elevation view.

Referring now to the drawing and first more especially to Figs. 1 and 2, there is shown therein a preferred form of fork assemblage essentially comprising generally vertically disposed stem and fork members 1 and 2 having their adjacent ends pivotally connected together and spring means 3 interposed between said members so as to yieldably oppose relative pivotal movement thereof in one direction. Said stem member 1 is adapted to be rotatably supported in a bearing formed in the front end of a bicycle frame (not shown) and to have connected to its upper end the usual handlebars by which the bicycle may be steered. Said fork member 2 is provided with downwardly extending and slightly forwardly curved legs 4 and 5 to the lower slotted ends 6 and 7 of which is adapted to be secured in a well-known manner the axle of a front wheel assemblage with the wheel thereof disposed between said legs. Inasmuch as the bicycle construction referred to is so well known, illustration thereof has been deemed unnecessary in order to fully comprehend of the structure and advantages of the present invention.

Said stem member 1 may be of welded construction as shown comprising a generally vertically disposed tubular member 8 having a threaded upper end carrying a cross-piece 9, said cross-piece being formed with an apertured lug 10 at each end, to each of which lugs is connected as by nuts 11 and 12 a downwardly curved truss rod 14. Said nuts 11 and 12 are threaded onto the upper end of said truss rod 14 and are disposed on opposite sides of said lug 10 whereby to enable firm clamping of said truss rod to said cross-piece.

Figure 3:
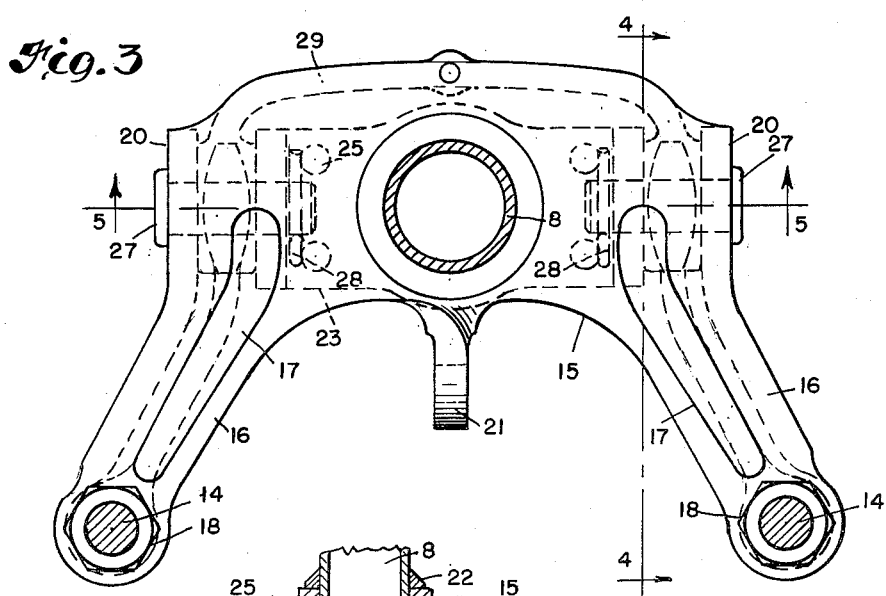
Fig. 3 is a horizontal cross-section view taken substantially along the line 3—3, Fig. 2.
Figure 5:
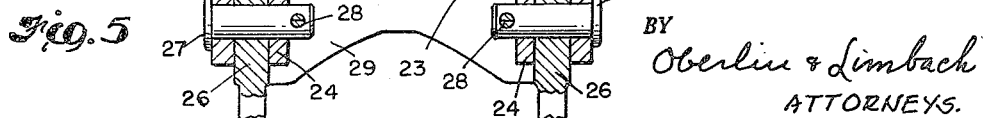
Fig. 5 is a fragmentary vertical cross section view taken substantially along the line 5—5, Fig. 3.

As most clearly shown in Figs. 3 and 5, there is secured to the lower end of said tubular member 8 a laterally projecting member 15 provided with forwardly diverging legs 16 which include stiffening ribs 17 thereon and connected to the outer ends of said legs 16 are the lower ends of the truss rods 14, nuts 18 and 19 being employed for so connecting the truss rods 14 to the outer ends of said legs 16. Said member 15 is also formed with downwardly turned opposite sides which form apertured ears 20 and with an intermediate vertically disposed lug 21 which serves as a convenient mount for a headlight or like bicycle accessory. As shown, the nuts 19 are preferably formed with spiral grooves thereabout into which the coils of the springs 3 engage. Encircling said member 8 above the member 15 is a cone 22 forming a bearing race engageable with a bearing disposed within the bicycle frame.

Said member 15 may be conveniently fabricated by punching the same from flat plate stock and bending the same to form the ears 20 and the lug 21 followed by welding or other manner of securing the same to the lower end of the tubular member 8.

Welded to both of the members 8 and 15 is a U-shaped cross-piece 23 which is formed with down-turned apertured legs 24 which are in register with, but spaced from, the ears 20 on said member 15. To facilitate welding of said cross-piece 23 to member 15 the former is provided with protruberances 25 on its upper surface.

The pivotal connection between said fork member 2 and stem member 1 comprises two apertured portions 26 at the upper ends of the legs 4 and 5 each of which portions are fitted between one of the two pairs of ears 20 and 24 and headed pivot pins 27 through said ears 20 and 24 and said portions 26 which are retained in place as by cotter pins 28 diametrically through the shank portions of said pins and disposed inside of the innermost ears 24. It will be apparent that in some cases it may be desirable to use a single pivot pin rather than two separate pins as illustrated in the drawing.

Figure 4:
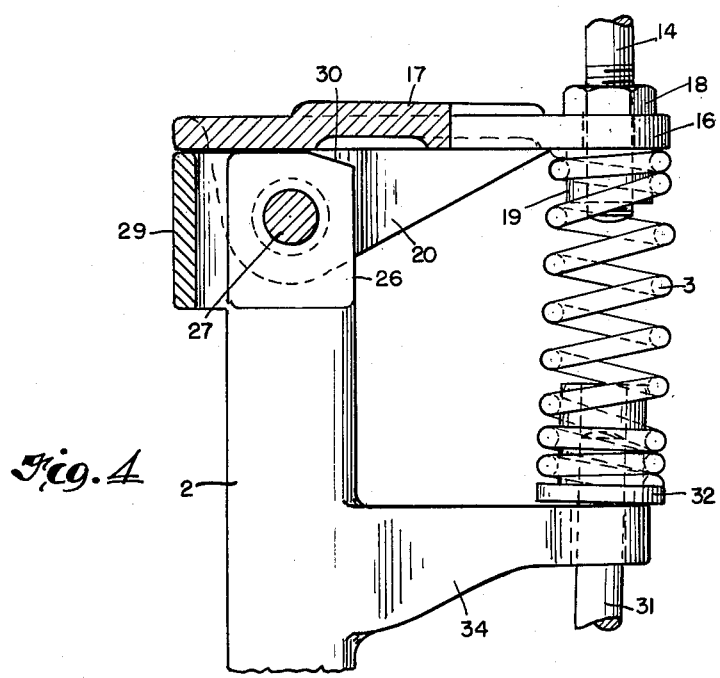
Fig. 4 is a fragmentary vertical cross section view taken substantially along the line 4—4, Fig. 3.

The upper surface of the leg connecting portion 29 of said fork member 2 is adapted to engage with the lower surface of the member 15 to thus provide a positive stop to prevent relative rotation of the stem and fork members in one direction. The upper edge 30 of the portions 26 of the fork legs are bevelled as best shown in Fig. 4 whereby to engage with the lower surface of member 15 upon predetermined relative rotation of said stem and fork members in an opposite direction. As will be seen, the springs 3 are operative to normally maintain the upper surface of the connecting portion 29 in engagement with the lower surface of member 15, the stem and fork members then being in the relative position shown in Fig. 1.

Connected to the lower ends of said legs 4 and 5 by the usual means are upwardly extending truss rods 31 having their upper ends disposed forwardly of said legs and directly below the lower ends of the truss rods 14, such upper ends of the truss rods 31 having threaded thereonto suitable spring guide and retainer nuts or collars 32 which form seats for the lower ends of the springs 3 compressed between the legs 16 of member 15 and the upper ends of the truss rods 31. In order to retain the rods 31 in a proper position, the legs 4 and 5 are each formed with a projection 34 having an opening therethrough through which one of said rods project, such opening in each projection 34 being sufficiently large so as to have a clearance with the associated truss rod 31 to thus allow for a slight variation in the angular disposition of the rod in such opening as clearly shown in Figs. 1 and 2. The fork member 2 described above will preferably be a steel forging to thus provide both a light weight and strong construction.

As shown in Fig. 2, the connecting portion 29 of said fork member 2 is preferably formed with a threaded opening in its lower surface for receiving a screw 35 or the like by which fender braces or the like may be secured to said fork member.

Having thus described the construction of one embodiment of this invention it is now apparent that after having desirably adjusted the assemblage by manipulation of the guide nuts 32 and nuts 18 and 19, etc., and preferably with the springs 3 compressed to a degree such that the weight of the driver on the bicycle only slightly disengages the normally engaged stop means previously referred to, travel of the front wheel of the bicycle over irregularities in the road will effect counter-clockwise rotation of the fork member 2 as viewed in Fig. 1 about pins 27, such rotation being yieldably opposed by the springs 3 whereby to prevent direct transmission of shock and impact loads to the handlebars attached to said stem member 1. In this case, the truss rods 14 and 31 are operative to take up and thus reduce stresses on the fork legs 4 and 5 and on the stem member 1.

Other modes of applying the principle of the invention may be employed, change being made as regards the details described, provided the features stated in any of the following claims, or the equivalent of such, be employed.

I therefore particularly point out and distinctly claim as my invention:

1. A fork assemblage for bicycles and the like, comprising a generally vertically disposed stem member provided with a lateral projection including opposite pairs of down-turned apertured ears, a generally vertically disposed fork member provided with downwardly extending legs connected together at their upper ends, the upper end of each of said legs being apertured and fitted between one of the pairs of such ears on said stem member, pivot pins through such ears and upper ends of said legs pivotally connecting said stem and fork members together, and spring means disposed radially outward of said pivot pins and compressed between said stem and fork members whereby to yieldably oppose relative pivotal movement of said members in one direction.

2. A fork assemblage for bicycles and the like, comprising a generally vertically disposed stem member provided with a lateral projection including opposite pairs of down-turned apertured ears, a generally vertically disposed fork member provided with downwardly extending legs connected together at their upper ends, the upper end of each of said legs being apertured and fitted between one of the pairs of such ears on said stem member, pivot pins through such ears and upper ends of said legs pivotally connecting said stem and fork members together, and spring means disposed radially outward of said pivot pins and compressed between said stem and fork members whereby to yieldably oppose relative pivotal movement of said members in one direction, said fork member being formed with a leg-connecting portion having an upper surface engageable with the lower surface of such projection on said stem member to arrest relative pivotal movement of said members in an opposite direction.

3. A fork assemblage for bicycles and the like, comprising a generally vertically disposed stem member provided with a lateral projection including opposite pairs of down-turned apertured ears, a generally vertically disposed fork member provided with downwardly extending legs connected together at their upper ends, the upper end of each of said legs being apertured and fitted between one of the pairs of such ears on said stem member, pivot pins through such ears and upper ends of said legs pivotally connecting said stem and fork members together, and spring means disposed radially outward of said pivot pins and compressed between said stem and fork members whereby to yieldably oppose relative pivotal movement of said members in one direction, the upper ends of such legs being formed with an upper surface inclined relative to the lower surface of such projection, such surfaces being engageable with one another upon predetermined relative pivotal movement of said members in such one direction.

4. A fork assemblage for bicycles and the like, comprising a generally vertically disposed stem member provided with a lateral projection including opposite pairs of down-turned apertured ears, a generally vertically disposed fork member provided with downwardly extending legs connected together at their upper ends, the upper end of each of said legs being apertured and fitted between one of the pairs of such ears on said stem member, pivot pins through such ears and upper ends of said legs pivotally connecting said stem and fork members together, truss rods on said fork member projecting upwardly from the lower ends of such legs to points radially outwardly of said pivot pins, and spring means disposed radially outward of said pivot pins and compressed between such projection of said stem member and the upper ends of said truss rods whereby to yieldably oppose relative pivotal movement of said members in one direction.

5. In a fork assemblage for bicycles, a stem assembly comprising a generally vertically disposed cylindrical member, a laterally projecting member secured to the lower end of said cylindrical member and provided with down-turned apertured ears on its opposite sides, a cross-piece beneath said laterally projecting member secured to one of said members and provided with down-turned apertured ears at its opposite ends in register with but spaced inwardly from the ears on said laterally projecting member, and a fork member having downwardly extending legs, the upper ends of which legs are fitted between said ears and pivotally connected thereto.

6. In a fork assemblage for bicycles, a stem assembly comprising a generally vertically disposed cylindrical member, a laterally projecting member secured to the lower end of said cylindrical member and provided with down-turned apertured ears on its opposite sides, a cross-piece beneath said laterally projecting member secured to both of said members and provided with down-turned apertured ears at its opposite ends in register with but spaced inwardly from the ears on said laterally projecting member, and a fork member having downwardly extending legs, the upper ends of which legs are fitted between said ears and pivotally connected thereto.

7. A fork assemblage for bicycles and the like, comprising a generally vertically disposed stem member provided with a lateral projection including opposite pairs of down-turned apertured ears, a generally vertically disposed fork member provided with downwardly extending legs connected together at their upper ends, the upper end of each of said legs being apertured and fitted between one of the pairs of such ears on said stem member, a pivot pin through each pair of ears and the upper end of the leg therebetween pivotally connecting said stem and fork members together, and spring means disposed radially outwardly of the pivot axis of said stem and fork members and compressed between said stem and fork members whereby to yieldably oppose relative pivotal movement of said members in one direction.

HARRY W. KRANZ.

REFERENCES CITED

The following references are of record in the file of this patent:

UNITED STATES PATENTS

| Number | Name | Date |
| --- | --- | --- |
| 874,721 | Adams | Dec. 24, 1907 |
| 2,188,968 | Uber | Feb. 6, 1940 |

FOREIGN PATENTS

| Number | Country | Date |
| --- | --- | --- |
| 18,727 | Great Britain | 1914 |
| 199,513 | Great Britain | June 28, 1923 |